United States Patent [19]

Roos et al.

[11] 3,911,274
[45] Oct. 7, 1975

[54] DEVICES FOR MOVING SAMPLE HOLDERS TO A MEASURING POSITION AND FOR EFFECTING RADIOACTIVE OR OTHER MEASUREMENTS OF SAMPLES IN THE HOLDERS

[75] Inventors: Cornelis J. Roos, The Hague; Peter Gilles, Rijswijk, both of Netherlands

[73] Assignee: Baird Atomic (Europe) B.V., The Hague, Netherlands

[22] Filed: Aug. 7, 1973

[21] Appl. No.: 386,354

[30] Foreign Application Priority Data
Aug. 8, 1972  Netherlands.................... 7210822

[52] U.S. Cl. ............................................. 250/328
[51] Int. Cl. ............................................. G01t 7/02
[58] Field of Search .......... 250/328, 369; 214/1 BB, 214/16 B, 16.4 A, 310

[56] References Cited
UNITED STATES PATENTS
3,604,935  9/1971  Nather................................. 250/328
3,678,277  7/1972  Greenspan et al................. 250/369

Primary Examiner—James W. Lawrence
Assistant Examiner—Davis L. Willis
Attorney, Agent, or Firm—Mason, Mason & Albright

[57] ABSTRACT

A sample measuring device, for example for measuring the radio-activity of a number of samples, comprises a carriage movable along first guides, and a slide movable along second guides on the carriage, the second guides extending transversely to the first guides. A vertically movable grab is carried by the slide and can be positioned, by movement of the carriage and slide, over a sample holder, a plurality of sample holders being arranged in rows in a stationary rack. The grab is arranged to remove the sample holder from the rack, to carry the sample holder to a measuring position and then to return the sample holder to its former position in the rack. The grab is moved by a control program to transfer each sample holder between the rack and the measuring position.

13 Claims, 3 Drawing Figures

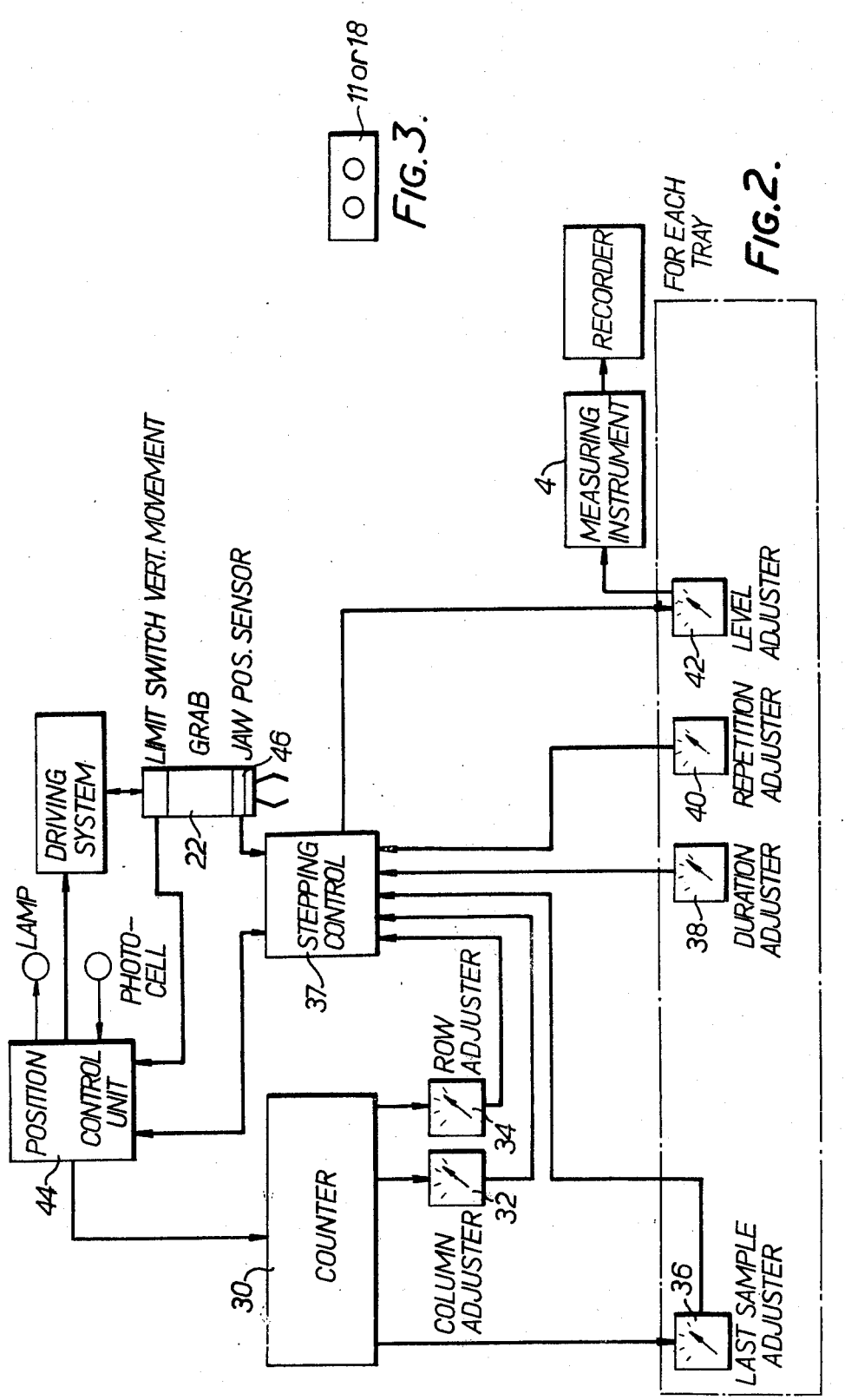

DEVICES FOR MOVING SAMPLEHOLDERS TO A MEASURING POSITION AND FOR EFFECTING RADIOACTIVE OR OTHER MEASUREMENTS OF SAMPLES IN THE HOLDERS

BACKGROUND OF THE INVENTION

1. Field of the Invention.

The present invention relates to sample-measuring devices.

2. Description of the Prior Art.

There have been proposed devices for measuring the radio-activity of a number of samples, comprising a rotatable circular disc provided with a circular array of holes or other recesses in which the samples can be placed. The disc is rotated step-wise to position successive samples in front of a suitable counting tube for measuring the radiation. This device is disadvantageous in that the counting tube is not positioned symmetrically with respect to the different samples, which samples may emit radiation of different intensities which can give rise to fluctuations in the background radiation in spite of good screening of the counting tube. For precise measurements a zero measurement should, therefore, be performed before and after each sample measurement.

In order to eliminate this disadvantage, it has been proposed to position the counting tube in the center of the rotatable disc, the successive samples being lifted from the disc in a given position of the latter by means of a lifting assembly. In this case, the counting tube is always symmetrically orientated in respect of all the samples, so that fluctuations in the background radiation will be substantially eliminated. A disadvantage arises however, in that the number of samples which may be arranged in a disc of reasonable dimensions is limited.

In order to remove this disadvantage, devices have been proposed in which a chain or conveyor belt is arranged to move sample holders step-wise towards the measuring instrument or towards a position from which each sample holder can be transferred to the measuring instrument. A disadvantage of such devices is that the sample holders need to be placed one by one in or on the chain or belt, and that the position of the measuring instrument is assymmetrical with respect to the arrangement of samples in the device.

Devices have also been proposed in which supporting racks, in which sample holders are arranged in mutually perpendicular rows and columns, are movable step-wise in the direction of the rows and columns in order to bring each sample in turn towards a position at which the measuring instrument is positioned, or from which the sample holders can be transferred successively towards this instrument. A disadvantage of such devices is that the number and dimensions of the racks are limited, since space should remain available for moving a number of the racks step-wise, and also, these racks need to be moved as a unit such a unit having a relatively large mass.

Particularly for medical analyses, a requirement exists for a device in which large numbers of samples, for instance of blood or similar physiological liquids, can be measured with a minimum of intervention by operators.

SUMMARY OF THE INVENTION

According to the present invention, there is provided in a sample-measuring device, measuring means, and moving means operative to remove sample holders from a predetermined position in a carrier in accordance with a control program, to transfer the holders to the measuring means and to return the holders from the measuring means to the predetermined positions, said carrier being in the form of removable tray means which remains stationary during the measuring operation, the sample holders being arranged in mutually perpendicular rows and columns in the tray means, and the said moving means comprising a carriage, first guide means extending in the direction of the said rows of sample holders, a first motor operative to move the carriage along the first guide means, slide means mounted on the carriage, second guide means, said second guide means extending transversely to the first guide means, a second motor operative to move the slide means relative to the carriage along the second guide means vertically movable grab means for engaging the sample holders, said grab means being carried by the slide means, first contact means fixed in relation to the first and second guide means, and second contact means movable with the carriage and the slide means, said first and second contact means cooperating to energise the said motors to position the grab means successively above the respective sample holders in the tray as determined by the control program, the measuring means being positioned between the first guide means such that a said sample holder removed from the tray means by the grab means is located by the grab means in a measuring position at Which a measuring operation is effected by the measuring means, and the sample holder is returned to its predetermined position in the tray means.

BRIEF DESCRIPTION OF THE DRAWING

An embodiment of the invention will now be described, by way of example only, with reference to the accompanying diagrammatic drawing, in which

FIG. 2 is a block diagram of a control circuit of the device; and

FIG. 3 is an elevation of a modified form of position control means of the apparatus.

DESCRIPTION OF THE PREFERRED EMBODIMENT

Figure 1:
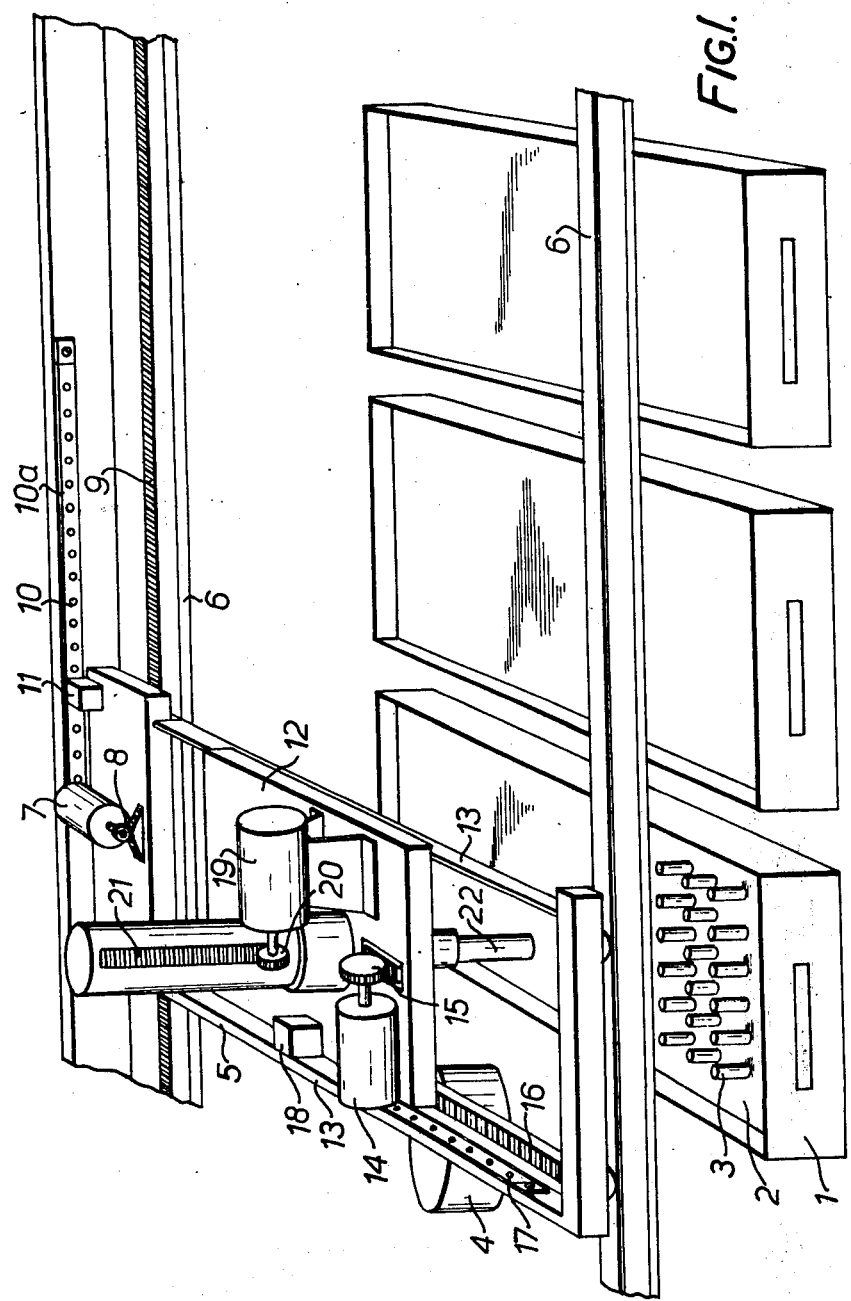
FIG. 1 is a perspective view of a sample-measuring device in accordance with the present invention.

The sample-measuring device shown in FIG. 1 comprises a frame in which is arranged a number of trays or drawers 1 which remain stationary during a measuring operation. A control circuit of the device is shown in FIG. 2 and will be described later.

In each tray 1, one or more racks 2 are arranged and are provided with recesses in which sample holders 3 are placed. The sample holders 3 are generally in the form of open or closed tubes filled, for instance, with liquid samples. The racks 2 are constructed in such a manner that the sample holders are arranged therein in mutually parallel rows and, perpendicularly thereto, in mutually parallel columns.

The measuring device is constructed to measure radioactivity and comprises a radiation measuring instrument 4, which is enclosed in a suitable screening jacket. Preferably, the instrument 4 is in the form of a scintillation counter, a scintillation crystal of which has a recess in which the sample holders 3 are received. When performing a measurement, the sample holders 3 are transferred one by one from the tray 1 to the measuring instrument 4.

The sample holders 3 are transferred between the tray 1 and a carriage 5 which is movable on a pair of guides 6 parallel to the rows of sample holders in the trays 1. The carriage 5 is provided with a motor 7 driving a pinion 8 which engages a rack 9 on one or both of the guides 6. One of the guides 6 is provided with a series of light sources 10, the mutual distance and position of which corresponds to the different consecutive columns of the sample holders of the different trays 1. By the term "light source" as used herein there is meant not only sources of visible light but also sources of invisible radiation, for example infra-red radiation. Preferably, the light sources comprise semiconductor elements which emit radiation on being energised. The latter have the advantage of a low power consumption and heat generation, and of being quickly and easily switched on and off. Moreover, such sources have a long working life and are very reliable.

The carriage 5 also carries a photo-cell 11 which can receive radiation from the sources 10. The photo-cell is arranged to emit a signal which stops the motor 7 as soon as the carriage 5 has reached the position determined by an energised source 10.

A slide 12 is mounted on the carriage and is movable on guides 13, the latter extending perpendicularly to the guides 6. The slide 12 is provided with a motor 14 driving a pinion 15 which co-operates with a rack 16 on one guide 13 whereby to move the slide 12 along the guides 13. One of the guides 13 is provided with light sources 17 similar to the sources 10, the slide 12 carrying a photo-cell 18, so as to control the motor 14. The sources 17 are spaced by mutual distances corresponding to the different rows of sample holders 3 in the trays 1. The slide 12 carries a motor 19 which drives a pinion 20 engaging a vertical rack 21. The rack 21 is connected to a grab 22 which, upon actuation of the motor 19, can be moved vertically between two extreme positions.

The respective light sources 10 and 17 are actuated by suitable control programing means to provide consecutive scanning of the different rows of the tray 1. In order to facilitate fast movement and a precise positioning, more than one light source can be energised to determine each stopping position of the grab, more than one photo-cells 11 or 18 likewise being provided as shown in FIG. 3. As soon as the leading photo-cell (with respect to the direction of movement) has reached the first energised light source, the driving speed of the motor in question is reduced, and, as soon as two photo-cells are facing two light sources, a braking circuit is actuated. Thus with two or three photo-cells, very precise braking at high driving speeds can be obtained.

The slide 12 and the carriage 5 have a relatively low mass so that simple light-weight motors can be used, and also braking is facilitated because of the small inertia. The trays 1, which are relatively heavy, remain stationary and, when handling liquid samples, there is no risk of liquid being spilt. Since the trays 1 are not moved, no additional space for the trays 1 needs to be provided, thus permitting efficient utilisation of the space within the device. Further, the orientation of the trays 1 with respect to the measuring instrument 4 is always the same, so that the background effect which is caused by the presence of the plurality of samples does not change during measurement. Therefore only a small number of zero calibrating measurements will be needed, for instance a small number for each tray, these measurements being effected by providing empty sample holders at the positions in question.

The racks 2 can be of the type used for example in automatic filling, mensurating or titration devices, and can be used for other tests to be performed in the laboratory. The racks can be used for consecutive tests without the sequence of the samples needing to be changed. These racks need only to be placed in the trays 1 which can be positioned separately or in groups in the device. This will considerably expedite the preparation of the samples for measurement, and the risk of errors is reduced.

When a tray 1 is not completely filled with samples, the device will continue the scanning movements described. It is, therefore, preferable to provide the programming means with adjusting means for indicating the last sample in the tray; after measurement of this sample the carriage is advanced towards the next tray 1. Separate such adjusting means are provided for each tray.

Preferably adjusting means for each tray are provided which also allow the adjustment of the measurement range or level, the measurement duration, and the number of times that a measurement is to be repeated. It is, then, possible to arrange samples of a different kind in different trays, with the measuring instrument 4 being adjusted at the correct range for each tray. Of course the measurement of each sample can be effected simultaneously in different measuring channels, for example when the individual samples contain more than one isotope. Suitable adjustment units for each tray can comprise only those elements which are required for the separate adjustment or control, the other elements of the programing means and the measuring circuit being common to all units. In this manner a simple structure is obtained, enabling an extension of the device to be effected without radical changes.

In different laboratories the racks 2 used and the dimensions of the sample holders will not always be the same. The dimensions of the sample holders determine the number that can be accommodated in a tray. The construction of the device described above permits in a simple manner, the device to be used with different dimensions of the sample holders. For this purpose, the light sources 10 and 17 are mounted on detachable strips 10a and 17a respectively, different strips of sources 10 corresponding to different sample holder dimensions, the light sources of these different strips being spaced by different distances, the programming means remaining unchanged. The latter is dependent on the number of samples in each row and column, and, for this purpose use can be made of an adjustable counter suitable for the largest prevailing number of samples, and provided with terminals for smaller numbers of samples. When the counter reaches the terminal associated with the number of samples used, the device is switched towards the next row. It will be clear that, in this manner, it is possible to adapt the device for different requirements while maintaining the principal elements of the device. When using multiple photo-cells 11 and 18, the distance between the photo-cells will correspond to the distance between the light sources, such correspondence being provided using photo-cell assemblies or by using suitable masks.

The grab 22 preferably comprises clamping jaws which are able to hold sample holders in the form of collarless tubes, and which, when being vertically displaced, can be brought into engagement with a sample holder. If necessary different jaws can be used for different sizes of sample holders. The jaws can be provided with means for indicating when the jaws have been closed beyond a given position, said means being connected to the programming means in such a manner that, when a sample is absent in a given position, and, thus, the jaws can be completely closed, a complete transfer operation to and from the measuring instrument 4 is prevented.

The device particularly described can accommodate a relatively large number of samples and has a relatively fast operation time since only small masses need to be displaced. Further the device can be adapted to special requirements by using a number of prefabricated units, and also the device can readily be enlarged. Since the trays remain in the same position during measurement of the entire batch of samples, the background effect will remain substantially constant for each measurement.

Although only radioactivity measurements are considered in the preceding description, it will be clear that the device is also suitable for effecting other kinds of measurements.

The construction of the programming means will readily be apparent to those skilled in the art. In particular the programming means can comprise electronic counting stages for controlling the consecutive stepwise movements of the carriage and the slide. It will be clear that the number of rows and columns to be scanned can be simply adjusted by means of suitable switches indicating the last counter of the series in question which is to be operated. On reaching the last sample on a tray, transfer towards the first sample of the next tray can be easily effected by moving the carriage and the slide appropriately.

The adjusting means for the measuring range or level and the measuring period as well as the number of repetitions of the measurement, can be made automatic, for instance for effecting an automatic switching at the transfer towards the next tray. A control circuit incorporating the adjusting means described above is shown in FIG. 2.

The circuit comprises a counter 30 with an adjuster 32 which is set to the number of sample holders in each column, and an adjuster 34 which is set to the number of sample holders in each row.

For each tray, there is provided an adjuster 36 set to the number of sample holders in the tray whereby when the last sample holder is replaced in the tray after the measuring operation, the adjuster 36 triggers a stepping control 37 to advance the grab 22 to the next tray. Also for each tray, there is provided an adjuster 38 for adjusting the duration of the measurements, an adjuster 40 which can be set to enable measurement to be repeated, and an adjuster 42 which enables the measurement range to be adjusted.

A position control unit 44 effects accurate location of the grab 22 by means of the light sources and photo-cells.

A sensor 46 associated with the jaws of the grab 22 is linked to the stepping control 37. If the jaws of the grab completely close, thus indicating the absence of a sample holder from its predetermined position in the tray, the sensor 46 causes the stepping control 37 to index the grab directly to the following sample holder.

In the control system, adjusters 36, 38, 40 and 42 are provided for each tray and are combined in a control unit associated with the tray; all of the other components of the system are common for all of the trays.

What is claimed is:

1. In a sample-measuring device,
   measuring means, and
   moving means operative to remove sample holders from predetermined positions in a carrier in accordance with a control program, to transfer the holders to the measuring means and to return the holders from the measuring means to the predetermined positions, said carrier being in the form of removable tray means which remains stationary during the measuring operation, the sample holders being arranged in mutually perpendicular rows and columns in the tray means, and the said moving means comprising
   a carriage,
   first guide means extending in the direction of the said rows of sample holders,
   a first motor operative to move the carriage along the first guide means,
   slide means mounted on the carriage,
   second guide means, said second guide means extending transversely to the first guide means,
   a second motor operative to move the slide means relative to the carriage along the second guide means,
   vertically movable grab means for engaging the sample holders, said grab means being carried by the slide means,
   first contact means fixed in relation to the first and second guide means, and
   second contact means movable with the carriage and the slide means, said first and second contact means co-operating to energise the said motors to position the grab means successively above the respective sample holders in the tray as determined by the control program, the measuring means being positioned between the first guide means such that a said sample holder removed from the tray means by the grab means is located by the grab means in a measuring position at which a measuring operation is effected by the measuring means, and the sample holder is returned to its predetermined position in the tray means.

2. A device as claimed in claim 1, comprising a plurality of said tray means, the tray means being so positioned in the device that the rows of sample holders in adjacent tray means are aligned, the first guide means having such a length as to permit the carriage to traverse all of said tray means, and the contact means being arranged to subject the respective sample holders of a said tray means to a measuring operation after the sample holders of a preceding said tray means have been subjected to a measuring operation.

3. A device as claimed in claim 1, wherein the control program is determined by programming means, said programming means comprising an adjustable element adjustable according to the number of samples to be measured in each tray, means whereby when the tray means is incompletely filled, the measurement operation is stopped at the last sample holder or is transferred to a subsequent said tray means.

4. A device as claimed in claim 3, further comprising
a separate control unit for each tray means, each unit comprising
an adjusting element for designating the last sample holder of the tray means.

5. A device as claimed in claim 4, wherein each control unit comprises
an adjusting element for adjusting the measuring range and/or duration of the measuring operation for the sample holders of the tray means.

6. A device as claimed in claim 4, wherein each control unit comprises
an adjusting element for adjusting the number of times that a measurement operation is to be performed for each sample holder.

7. A device as claimed in claim 1, wherein the control program is determined by programming means, said programing means comprising
a counter which is adjusted to the maximum number of sample holders in a row and column, and is arranged to effect movement of the grab means towards the next row at the end of the row, said counter being arranged to be adjusted in dependence on the number of sample holders in each row.

8. A device as claimed in claim 7, wherein the second contact means are arranged on interchangeable panels, and, for each sample holder dimension, a corresponding set of panels is provided.

9. A device as claimed in claim 1, wherein the grab means is arranged to sense the absence of a said sample holder, and is coupled to the programing means such that when the absence of a sample holder is sensed, the grab means is advanced towards the subsequent sample holder.

10. A device as claimed in claim 9, wherein the grab means comprises
clamping jaws arranged to be brought into engagement with a sample holder, the absence of a sample being sensed when the clamping jaws are closed beyond a predetermined position.

11. A device as claimed in claim 1, wherein the contact means comprises
sources of radiation, and
cells sensitive to the radiation.

12. A device as claimed in claim 1, wherein more than one contact means is rendered operative during each movement of the grab means whereby to provide a step-wise braking of the said motors.

13. A device as claimed in claim 1, wherein the carriage and the slide means are moved substantially simultaneously to effect movement of the grab means.

* * * * *